United States Patent [19]
Kai

[11] Patent Number: 5,943,503
[45] Date of Patent: Aug. 24, 1999

[54] STATUS-CONTROLLED INTERROGATION OF PERIPHERAL DEVICE STATUS

[75] Inventor: Hiroshi Kai, Kawasaki, Japan

[73] Assignee: Canon Kabushiki Kaisha, Tokyo, Japan

[21] Appl. No.: 08/781,058

[22] Filed: Jan. 9, 1997

[30] Foreign Application Priority Data

| Jan. 9, 1996 | [JP] | Japan | 8-018064 |
| Oct. 2, 1996 | [JP] | Japan | 8-261791 |

[51] Int. Cl.⁶ ............................................. G06F 13/00
[52] U.S. Cl. ..................... 395/839; 395/835; 395/113
[58] Field of Search ............................. 395/835–839, 395/113

[56] References Cited

U.S. PATENT DOCUMENTS

| 5,239,627 | 8/1993 | Beck et al. | 395/275 |
| 5,537,550 | 7/1996 | Russell et al. | 395/200.11 |
| 5,537,626 | 7/1996 | Kraslavsky et al. | 395/828 |
| 5,611,046 | 3/1997 | Russell et al. | 395/200.1 |
| 5,620,264 | 4/1997 | Kagita | 400/74 |
| 5,706,411 | 1/1998 | McCormick et al. | 395/113 |

*Primary Examiner*—Ayaz R. Sheikh
*Assistant Examiner*—Jigar Pancholi
*Attorney, Agent, or Firm*—Fitzpatrick, Cella, Harper & Scinto

[57] ABSTRACT

In a host computer which controls a peripheral device such as a printer, information is recognized which indicates a status of the peripheral device and a suitable time interval is selected to transmit on an interrogation command to demand the status of the peripheral device to the peripheral device. The time interval is selected based on the status of the peripheral device, and may be selected from among several time intervals set up in advance, for example, in a table.

54 Claims, 11 Drawing Sheets

FIG.7

|  | A FIRST ROW (IN AN ERROR) | A SECOND ROW (IN A NORMAL) |
|---|---|---|
| A FIRST LINE (OPERATING) | T1 | T3 |
| A SECOND LINE (NOT OPERATING) | T2 | T4 |

STATUS-CONTROLLED INTERROGATION OF PERIPHERAL DEVICE STATUS

BACKGROUND OF THE INVENTION

1. Field of the Invention

The present invention relates to an information processing apparatus such as a host computer which controls a peripheral device such as a printer via a bi-directional interface, a control program used in the information processing apparatus and a memory medium for storing the control program.

2. Related Background Art

In a conventional situation where a printer is connected to a host computer for printing images, the host computer receives an operation status of the printer as well as error information which indicates a paper jam, a starvation of ink or toner, and the like, from the printer.

After that, the host computer displays the received operation status and error information on a display unit.

Therefore the host computer can notify a user of the status of the printer.

In a case where the printer does not execute a printing operation, the host computer receives information which indicates on-line or off-line status of the printer, a status of opening or closing of the printer cover, and the like, from the printer.

After that, the host computer displays the received operation status and error information on a display unit.

As mentioned above, the host computer transmits an interrogation command to the printer to demand the status of the printer from the printer, gets the status from the printer, and displays the status information transmitted from the printer on the display unit, by changing the status information to a character, figure and the like.

In this case, the host computer usually transmits the interrogation command to the printer at a fixed time interval which is set in advance.

In the above case, even if the printer is operating and the printer's status is changing only for a short time, the host computer transmits the interrogation command to the printer at each and every fixed time interval.

If the fixed time interval which is set in advance is longer than an interval in which the status of the printer changes, a time difference is generated between a status change of the printer and the host computer's discovery of the status change of the printer.

In addition, if the fixed time interval which is set in advance is decreased, even if the printer is not operating and the status changes of the printer are comparatively few, the host computer has to transmit the interrogation command to the printer too frequently.

This causes performance degradation in the host computer and printer.

SUMMARY OF THE INVENTION

The present invention has been made in consideration of the above related arts. It is an object of the present invention to provide an information processing apparatus, a method of controlling a peripheral device such as a printer, and/or a memory medium storing a controlling program, which recognizes information which indicates a status of the peripheral and which selects a suitable time interval to transmit an interrogation command to demand a status of the peripheral device to the peripheral device, from among several time intervals set up in advance corresponding to information which indicates status of the peripheral device.

It is another object of the present invention to provide an information processing apparatus, a method of controlling a peripheral device, and/or a memory medium storing a controlling program, which improves performance of a information processing apparatus and a peripheral device and decreases a time difference between a status change of the printer and the information processing apparatus's discovery of the status change of the peripheral device so as to allow the information processing apparatus to display a more current status of the peripheral device.

According to the present invention, an information processing apparatus for controlling a peripheral device via a bi-directional interface includes recognition means for recognizing a status of the peripheral device based on a status information which was acquired from the peripheral device, and control means for controlling a time interval to transmit a command. The information processing apparatus issues the command to the peripheral device to interrogate for status of the peripheral device, corresponding to information which indicates status of the peripheral device.

Preferably, when the status information indicates that the peripheral device is operating or is in an error status, the control means decreases the time interval.

Likewise, when the status information indicates that the peripheral device is not operating, the control means increases the time interval.

It is also preferable, when the status information indicates that the peripheral device is in an error and operating, to minimize the time interval, and when the status information indicates that the peripheral device is in a normal and not operating, to maximize the time interval.

The information processing apparatus of the present invention may also include reception means for receiving the status information from the peripheral device, transmission means for transmitting the command to the peripheral device and display means for displaying the status.

Further objects, features and advantages of the present invention will become apparent from the following detailed description of the embodiments of the present invention with reference to the accompanying drawings.

BRIEF DESCRIPTION OF THE DRAWINGS

FIG. 7 is showing a data format of a status acquirement time interval table concerning the second embodiment.

DETAILED DESCRIPTION OF THE PREFERRED EMBODIMENTS

The first and second embodiments of the present invention will be described with reference to the accompanying drawings.

[First Embodiment]

Figure 1:
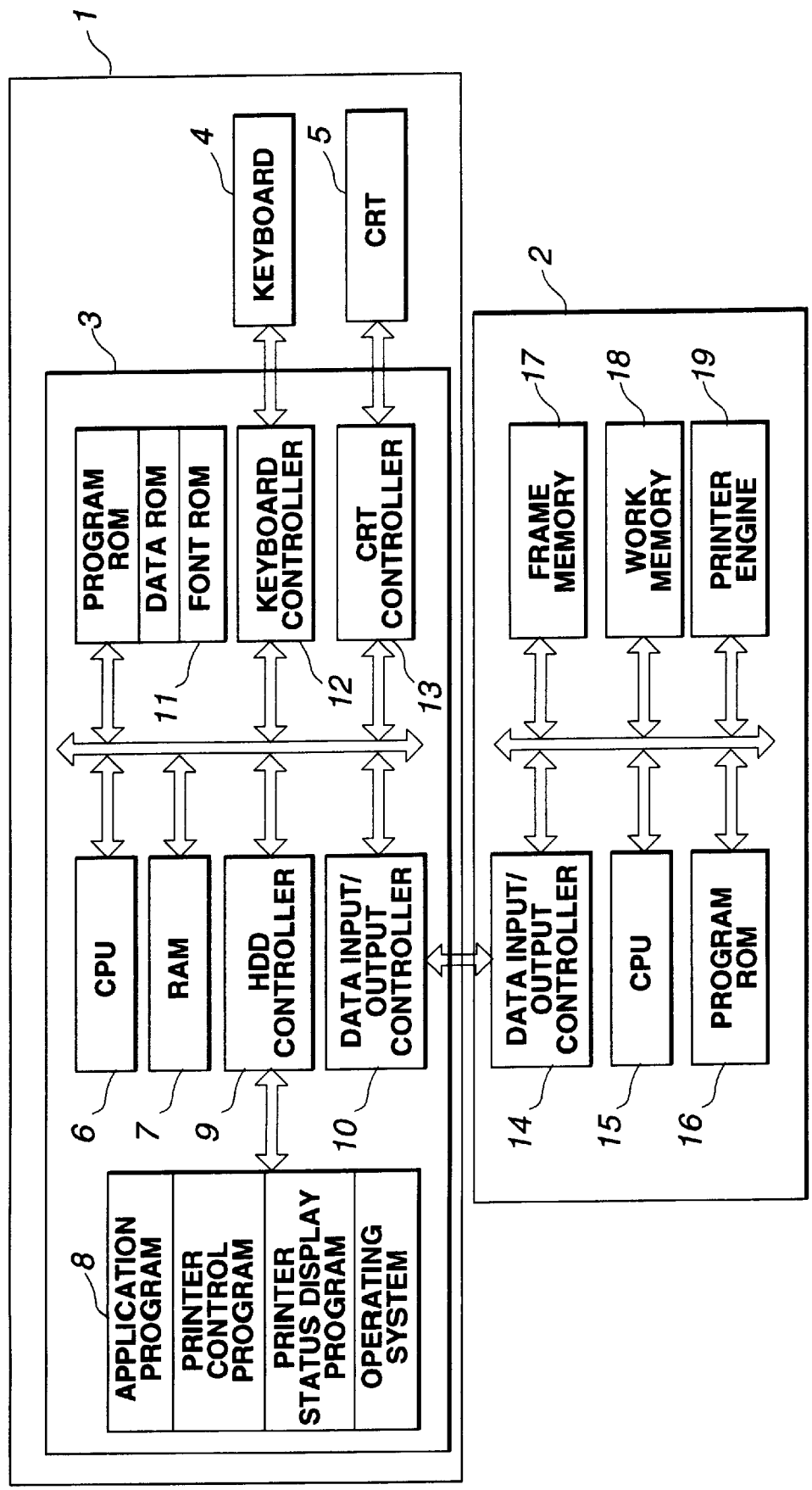
FIG. 1 is a block diagram showing the arrangement of a system having a information processing apparatus such as a host computer and a peripheral apparatus such as a printer concerning the first and second embodiments.

FIG. 1 is a block diagram showing the arrangement of a system having a information processing apparatus such as a host computer 1 and a peripheral device such as printer 2. This system is constituted by host computer 1 and printer 2. The host computer 1 is constituted by main body 3, keyboard 4, CRT display 5. Furthermore, main body 3 is constituted by CPU 6, RAM 7, hard disk (HD) 8, hard disk controller (HDDC) 9, data input/output controller 10, ROM 11, keyboard controller 12 and CRT controller 13.

Figure 8:
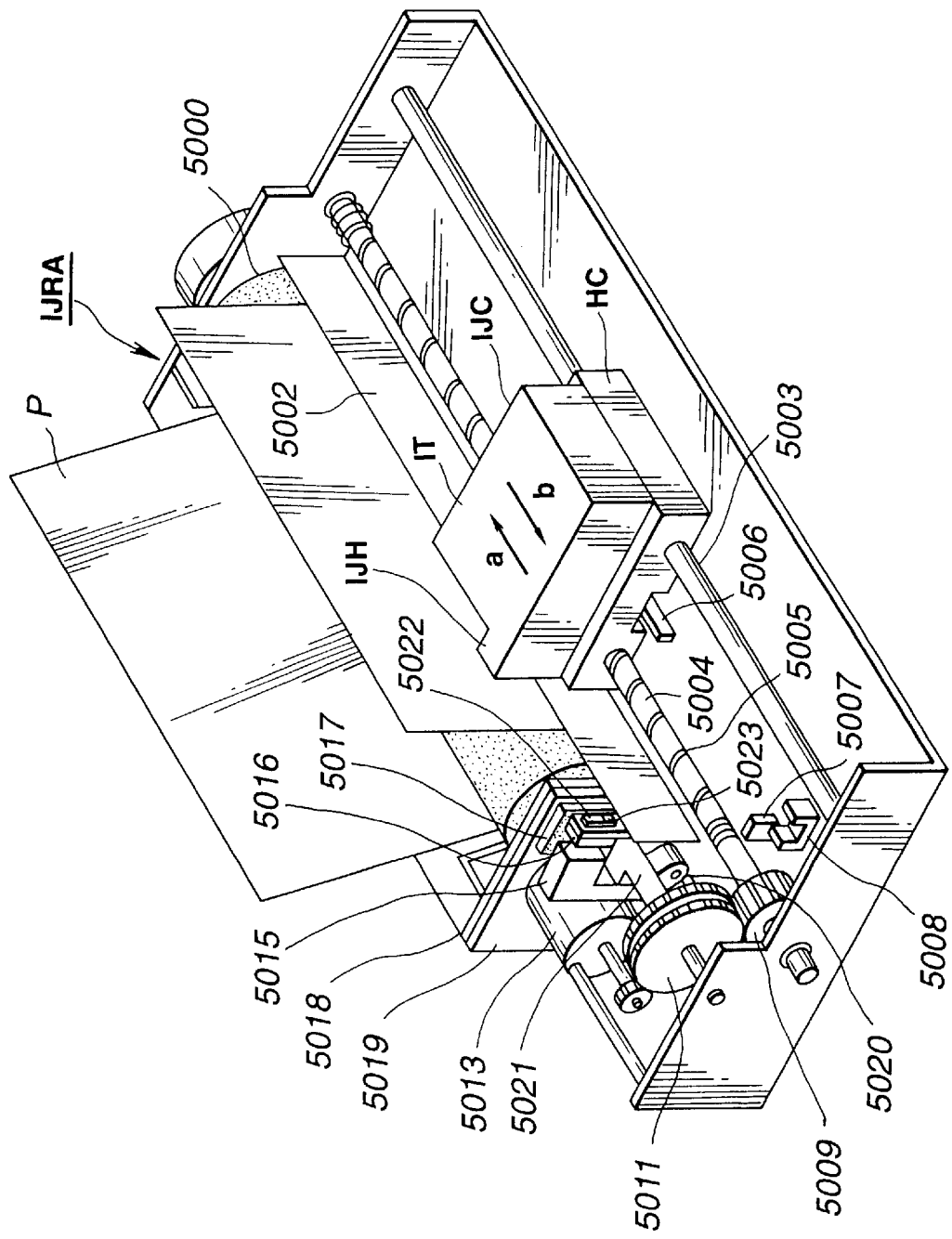
FIG. 8 is a perspective view of an ink-jet printer engine of a printer concerning the first and second embodiments.

Furthermore, printer 2 is constituted by data input/output controller 14, CPU 15, program ROM 16, frame memory 17, work memory 18 and printer engine 19, as shown in FIG. 8.

FIG. 8 is a perspective view of a printer engine 19, for example an ink-jet printer engine.

Referring to FIG. 8, a carriage HC is engaged with helical groove 5004 of reed screw 5005 which rotates upon clockwise/counterclockwise rotation of driving motor 5013 via driving force transfer gears 5011 and 5009. The carriage HC has a pin (not shown) and is reciprocated in the directions indicated by arrows a and b via guide rail 5003. An ink-jet cartridge IJC is mounted on the carriage HC. Reference number 5002 denotes a paper press plate for pressing a sheet against platen 5000 along the carriage moving direction.

Numerals 5007 and 5008 refer to photocouplers serving as home position detection means for checking the presence of carriage lever 5006 in a predetermined area to change the rotational direction of driving motor 5013.

Numeral 5016 refers to a member for supporting cap member 5022 for capping the entire surface of the recording head; and 5015 refers to a suction means for applying suction into the cap. Suction means 5015 performs suction restoration of the recording head via an opening.

Numeral 5017 refers to a cleaning blade which can be moved back and forth; 5018 refers to a body support plate which supports cleaning blade 5017 and member 5019; and 5021 refers to a lever for starting suction processing for suction restoration. Lever 5021 moves upon movement of cam 5020 engaged with the carriage. A driving force from the driving motor is controlled by a known transfer means such as a clutch switching means.

As these capping, cleaning, and suction restoration operations, desired processes can be performed at corresponding positions owing to the function of reed screw 5005 when the carriage reaches a home position area.

However, these desired operations may be performed at known timings.

Referring again to FIG. 1, each constituent shown will be detailed below. The host computer as an information processing apparatus in the system performs a function of outputting print dada such as image data including graphic patterns, images, characters generated by an application program, and the like, on the basis of operating system in hard disc 8, to printer 2 via printer control program (printer driver) in hard disc 8.

Furthermore, the host computer performs a function of displaying a status information of printer 2 on CRT 5 on the basis of operating system (OS) and printer status display program (status program) in hard disc 8 via CRT controller 13.

Furthermore, there are a printer driver to transmit an image data to printer 2 and printer driver to transmit a page description language (PDL) to printer 2.

Keyboard 4 is to input user data and has all conventional keys. CRT 5 displays all kinds of information like that shown in FIGS. 9 and 10. Furthermore, display means may be Liquid Crystal Display (L.C.D.) besides CRT display.

CPU 6 controls main body 3 on the basis of a variety of programs. RAM 7 is a random access memory and a RAM serving as the main memory to load all programs to be executed in main body 3 and is used as a work area while the program is operating. Hard disc 8 stores the application program, the printer control program (printer driver), the printer status display program (status program), the operating system (OS), data that these programs need when these programs are executed, and the like.

Hard disc controller 9 executes read/write processing of the data and programs stored in hard disc 8.

Data input/output controller 10 is connected to printer 2 via a bi-directional interface, such as bi-centronix interface under IEEE 1284 standard. Also data input/output controller 10 transmits data and printer control commands generated based on the printer control program to printer 2 and receives data such as a status and the like transmitted from printer 2 and stores the data in an internal memory (not shown) temporarily.

ROM 11 is a read only memory and is constituted by a program ROM storing a basic program to execute a variety of programs in main body 3 and to control variety controllers, a data ROM storing a data, a font ROM storing a font data that CPU 6 uses to display information on CRT 5, and the like. Keyboard controller 12 controls the key input operation of keyboard 4 connected host computer 1. CRT controller 13 controls display to CRT 5.

Printer 2 receives image data transmitted from host computer 1 and prints the received image data on a print paper. Furthermore, printer 2 receives an interrogation command to demand a status of printer 2 from host computer 1 and transmits the status of printer 2 to host computer 1 corresponding to the received command. Data input/output controller 14 receives the image data transmitted from host computer 1 and transmits the status of printer 2 to host computer 1.

CPU 15 controls printer 2. Program ROM 16 stores a printing program to command printer engine 19 to print the image data received from host computer 1.

Furthermore, when the printer receives a printer language such as a page description language (PDL) from host computer 1, program ROM 16 stores an emulation program to interpret the PDL and generate image data.

Frame memory 17 is a memory storing image data received from host computer 1 or generated from PDL based on the emulation program in program ROM 16. Work memory 18 is used when CPU 15 executes generation processing of the image data, printing processing of the image data, and the like. Printer engine 19 prints the image data stored in frame memory 17 on the paper with a color. Furthermore, the image data that printer 2 can print may include color pattern data.

Furthermore, when printer 2 receives a status interrogation command to demand a status indicating an error and operation of printer 2, CPU 15 in printer 2 discriminates if printer 2 is printing, if printer 2 is ejecting, if printer 2 is neither printing nor ejecting, or if printer 2 is in an error status. When printer 2 is in an error status, the printer transmits an error code set up in advance corresponding to the error to the host computer.

Figure 4:
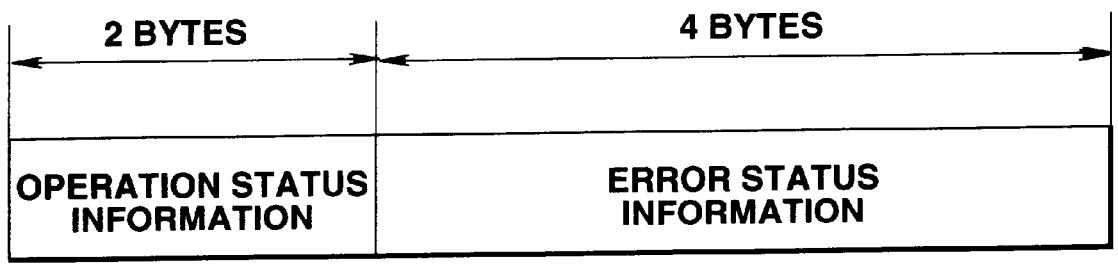
FIG. 4 is showing a data format of a status information concerning the first and second embodiments.

A data format of the error code is a printer status information like that shown FIG. 4.

In first embodiment, data input/output controller 10 is constituted by a command transmission means for transmitting a status interrogation command to printer 2 and a status reception means for receiving a status that indicates an error and operation of printer 2 from printer 2. CPU 6 in host computer 1 is constituted by a control means for controlling a time interval to transmit the status interrogation command to printer 2 corresponding to the status of printer 2.

Figure 2:
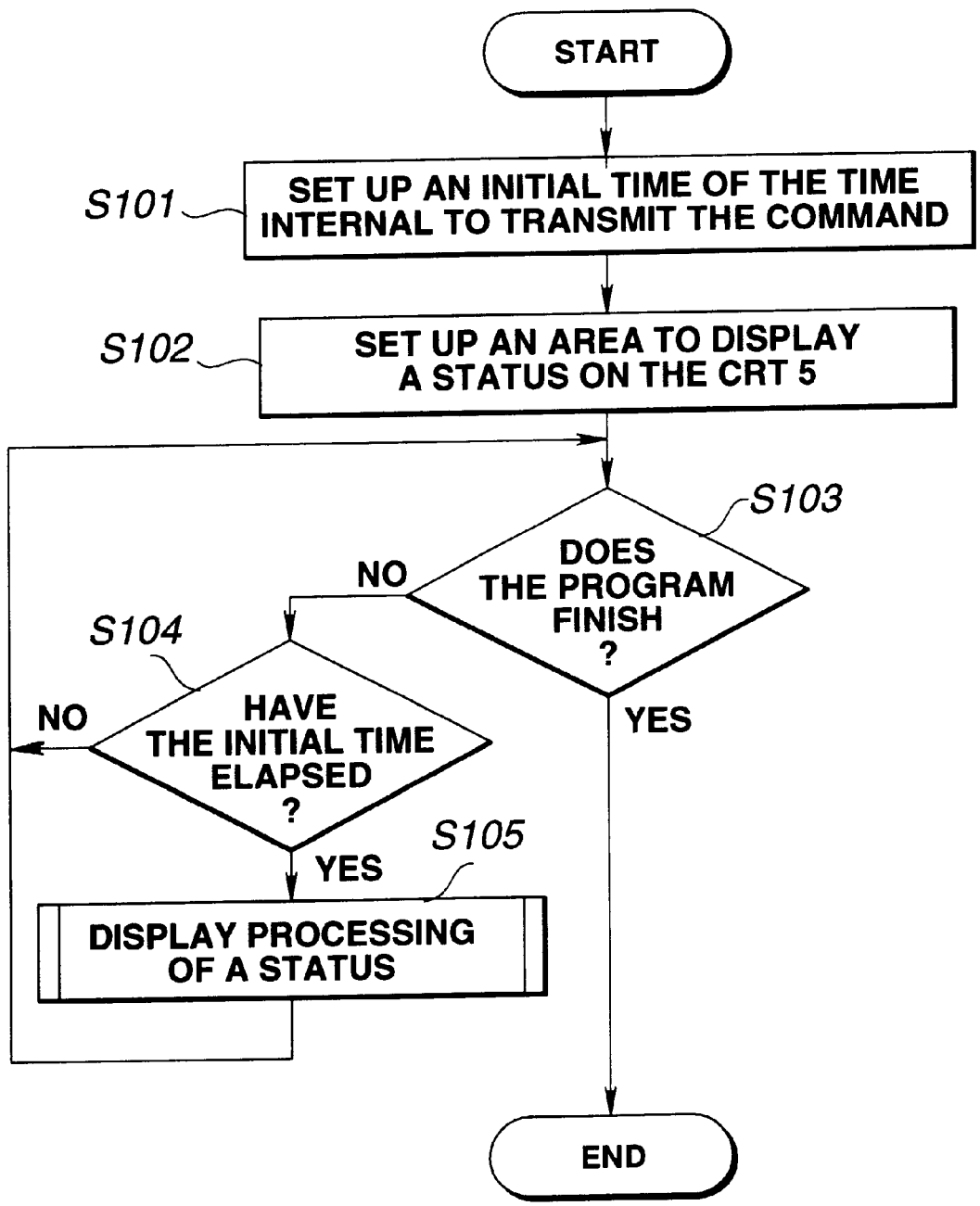
FIG. 2 is a general flow chart showing the general flow of processing in the host computer concerning the first and second embodiments.

FIG. 2 is a general flow chart showing the general flow of processing in host computer 1 concerning the first and second embodiments. The process steps shown in FIG. 2 are stored program process steps that are stored in a computer readable memory medium, in this case in hard disk 8, as explained below in connection with FIG. 12. The first embodiment will be described below with reference to FIG. 2 indicating the printer status display program (status program).

Figure 9:
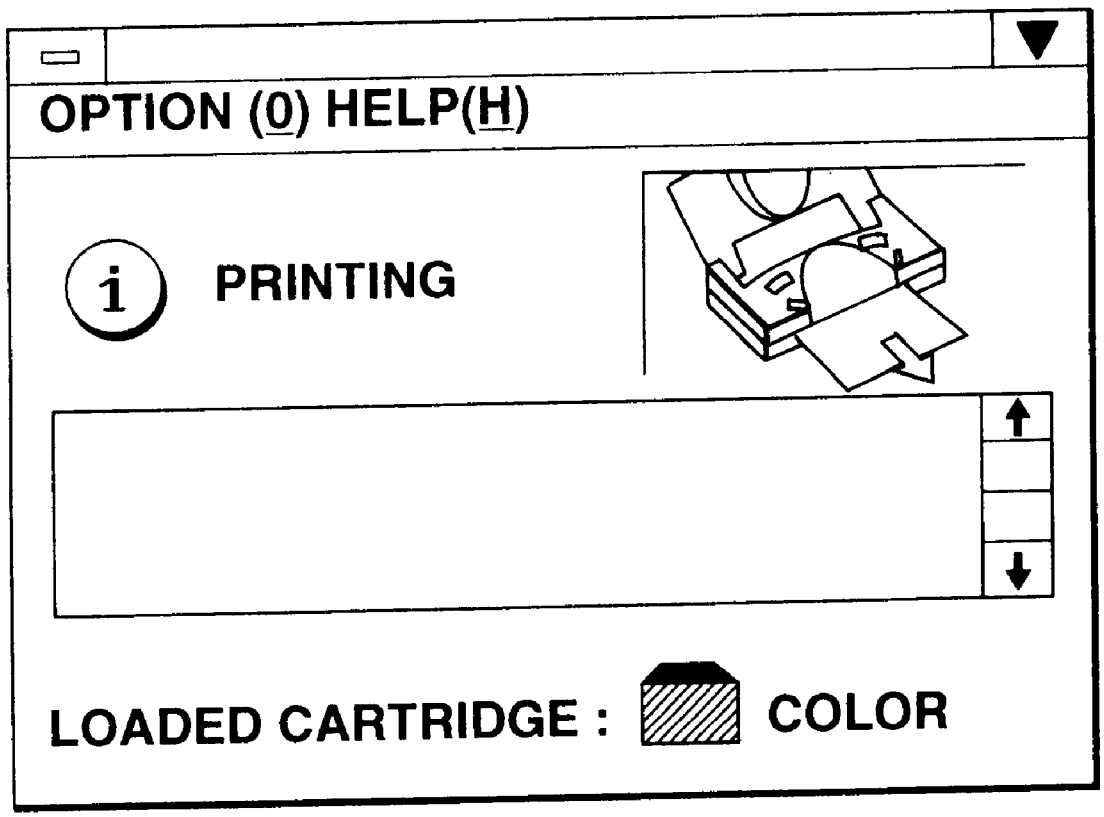
FIG. 9 is a representational view of a window display for indicating a status that the printer is printing, concerning the first and second embodiment.
Figure 10:
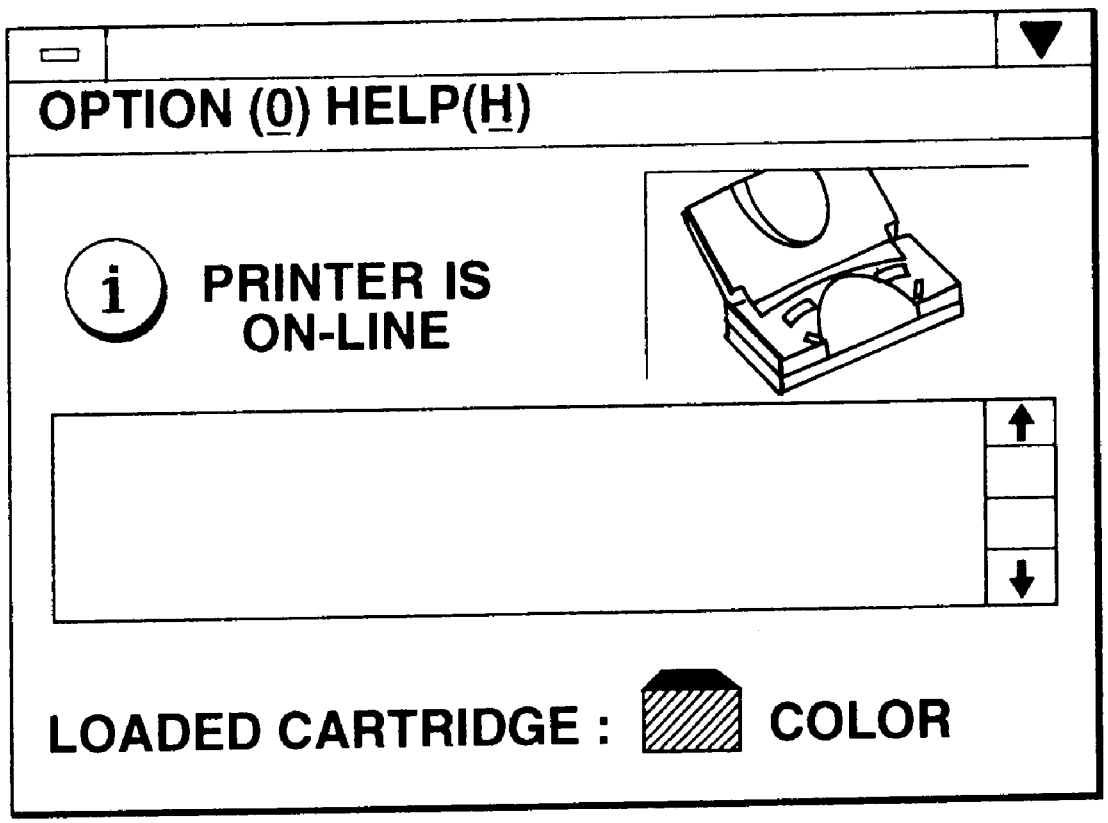
FIG. 10 is a representation view of a window display for indicating a status that the printer is standing by, concerning the first and second embodiment.

In step S101, CPU 6 set up an initial time of the time interval to transmit the status interrogation command to printer 2 for example 1.0 seconds and stores the initial time in a status acquirement interval recording area (not shown) in RAM 7 in host computer 1. In step S102, CPU 6 sets up an area to display a status on CRT5 in host computer 1. In the area, the status indicating an operation and error of printer 2 are displayed as a character and bit map image data such as what is shown in FIGS. 9 and 10.

In step S103, CPU 6 determines if the user demands a finish of the printer status display program (status program). If it is determined in step 103 that the user demands the finish of the printer status display program, CPU 6 finishes the program. On the other hand, if it is determined in step 103 that the user does not demand the finish of the program, CPU 6 determines if the initial time (for example, 1.0 seconds) stored in the status interrogation interval recording area in RAM 7 has elapsed since host computer 1 transmitted the status interrogation command to printer 2 in step S104. If it is determined in step 104 that the initial time (for example, 1.0 seconds) has elapsed, CPU 6 executes display processing of status in step S105 and flow returns to step S103 to repeat the series of operations.

On the other hand, if it is determined in step 104 that the initial time (for example, 1.0 seconds) has not elapsed, the flow returns to step S103 to repeat the series of operations.

Furthermore, a timer (not shown) is executed by CPU 6 corresponding to a start of the printer status display program. In the case that host computer 1 did not transmit the status interrogation command to printer 2, CPU 6 determines if the initial time (for example, 1.0 seconds) has elapsed since CPU 6 started the printer status display program.

According to FIG. 2, CPU 6 in an information processing apparatus (for example, host computer 1) repeats from step S103 to step S105 until the user demands the finish of the program.

Figure 3:
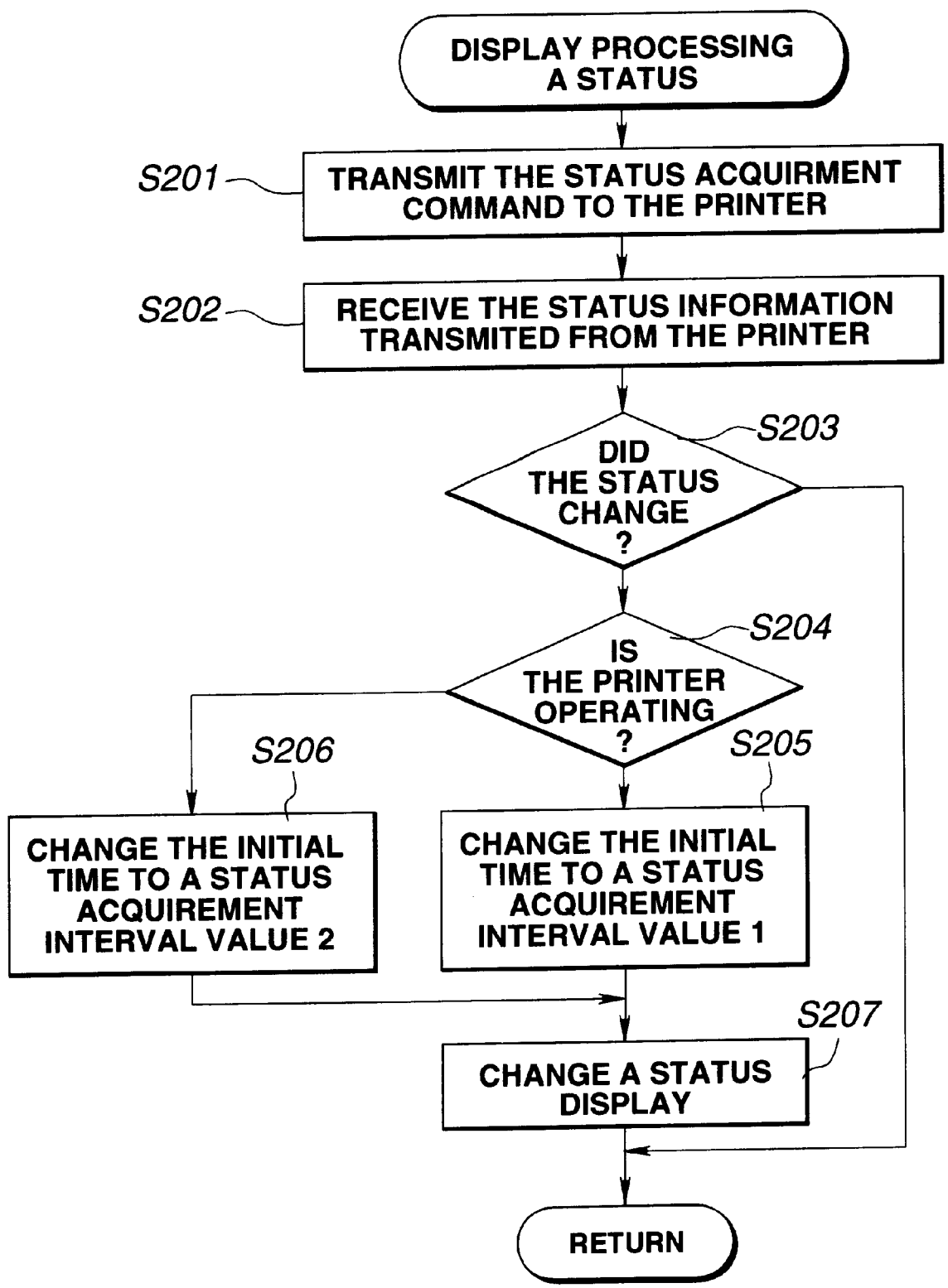
FIG. 3 is a flow chart showing the flow of status display processing in the host computer concerning the first embodiment.

FIG. 3 is a flow chart showing the flow of status display processing according to step S105 of FIG. 2 in host computer 1 concerning the first embodiment. The process steps shown in FIG. 3 are stored program process steps that are stored in a computer readable memory medium, in this case in hard disk 8, as explained below in connection with FIG. 12.

An operation of a status display processing shown in step S105 in FIG. 2 will be described below with reference to FIG. 3.

In step S201, CPU 6 in host computer 1 transmits the status interrogation command to printer 2, to determine a status that indicates an error and operation of printer 2. In step S202, CPU 6 in host computer 1 receives the status information transmitted from printer 2. The status information includes the operation information and error information of printer 2, shown in FIG. 4. The information is used as described below.

Furthermore, a two-byte character that indicates loading, printing, ejecting and non-operation is stored in a field of an operation status information in the work memory in RAM 7 shown FIG. 4.

In a field of an error status information in the work memory in RAM 7 shown FIG. 4, a four-byte error code indicates kinds of errors generated in printer 2 or no error. For example, paper empty may be shown by $1000_8$, and paper jam may be shown by $1300_8$.

After CPU 6 in host computer 1 receives the status information from printer 2 and stores the status information in the work memory in RAM 7, CPU 6 determines if the received status information changes from a status information of printer 2 which is displayed on CRT 5 of host computer 1 in step S203.

If it is determined in step S203 that the received status information has not changed from a prior status information of printer 2 which is displayed on CRT 5 of host computer 1, CPU 6 stops executing the display processing of the status and flow returns to step S103 to repeat the series of operations.

Furthermore, the status information of printer 2 which is displayed on CRT 5 is stored in the work memory in RAM 7. CPU 6 determines if the received status information has changed from the previously stored status information by comparing the received status information with the stored status information in step S203.

If CPU 6 determines that the received status information has changed from the previous status information which is displayed on CRT 5, CPU 6 determines if a status information in the operation status field of the received status information indicates either of loading, printing and ejecting in printer 2 in step S204.

Figure 5:
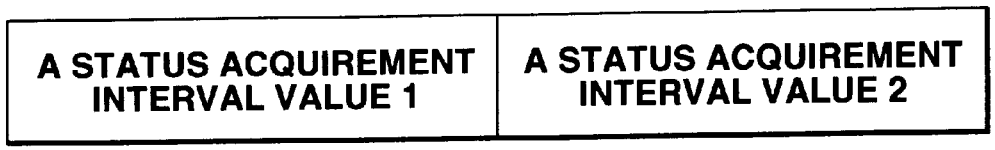
FIG. 5 is showing a data format of a time interval data to acquire the status data concerning the first and second embodiments.

When the status information in the operation status field indicates either of loading, printing or ejecting in printer 2, CPU 6 reduces the initial time (for example, 1.0 second) stored in the status interrogation time interval storage area in RAM 7 to a status interrogation time interval value 1 (for example, 0.5 second) set up in advance such as is shown in FIG. 5, in step S205, and flow advances to step S207.

On the other hand, when the status information in the operation status field indicates non-operation, CPU 6 increases the initial time (e.g. 1.0 second) stored in the status interrogation time interval storage area in RAM 7 to a status interrogation time interval value 2 (ex. 2.0 second) set up in advance such as is shown in FIG. 5, in step S206, and flow advances to step S207.

Furthermore, the status interrogation time interval value 1 and 2, such as is shown in FIG. 5, are stored in the work memory in RAM 7, in advance.

In the first embodiment, the status interrogation time interval value 1 is shorter than the status interrogation interval value 2 in advance. When printer 2 is operating and a status of printer 2 changes frequently, CPU 6 in host computer 1 acquires status information of printer 2 at a minimum time interval from printer 2 corresponding to this situation.

On the other hand, when printer 2 is not operating and status of printer 2 does not change frequently, as compared with the case that printer 2 is operating, CPU 6 in host computer 1 acquires a status information of printer 2 at a maximum time interval from printer 2 corresponding to this situation.

As a result, CPU 6 can avoid performance reduction of host computer 1 and printer 2.

After CPU 6 executes the processing of the step S205 or step S206, CPU 6 displays the status information received from printer 2 in step S202 on CRT 5 via CRT controller 13, in step S207 and the flow returns to step S103 shown in FIG. 2 to repeat the series of operations. For example, if the received status information indicates that printer 2 is printing, CPU 6 displays a window display, shown in FIG. 9, on CRT 5 in step S207.

Furthermore, if the received status information indicates that printer 2 is not operating, CPU 6 displays a window display shown in FIG. 10 on CRT in step S207.

To summarize, when CPU 6 in host computer 1 receives the status information from printer 2 after CPU 6 transmits the status interrogation command to printer 2 via bidirectional interface and displays the received status information on CRT 5 via CRT controller 13, CPU 6 controls the time interval to repeat the process steps for CPU 6 to receive the status information from printer 2 after CPU 6 transmits the status interrogation command to printer 2, according to whether printer 2 is not operating or operating.

For example, when the status information indicates that printer 2 is operating, or either loading, printing or ejecting, CPU 6 decreases the time interval. And when the status information indicates that printer 2 is not operating, CPU 6 increases the time interval.

Therefore, when printer 2 is operating and the status of printer 2 changes frequently, CPU 6 can update a status display at the short time interval corresponding to this situation.

Also, when the printer 2 is not operating and the status of the printer 2 does not change frequently, as compared with the case that the printer 2 is operating, the CPU 6 can make a frequency of update low. As a result, the CPU 6 can avoid performance reduction of the host computer 1 and printer 2.

Although the present embodiment is described in reference to a printer, the present invention may also be used in conjunction with other peripheral devices such as facsimile, copy machine, scanner, printer, and so on.

[Second Embodiment]

In the first embodiment, CPU 6 controls the time interval to repeat the series that CPU 6 receives the status information from printer 2 after CPU 6 transmitted the status interrogation command to printer 2, according as printer 2 is not operating or operating.

On the other hand, in the second embodiment, when printer 2 is in an error state, CPU 6 sets up the time interval to be shorter than a time interval set up when printer 2 is not in an error state, namely, CPU 6 minimizes the time interval. CPU 6 can update the status display at the short time interval. As the result, the user can deal with the error of printer 2 promptly.

A system constitution concerning the second embodiment is similar to a system constitution concerning the first embodiment. The difference between the first embodiment and the second embodiment is in display processing of the status. The display processing of the status in the second embodiment is shown in FIG. 6.

Figure 6:
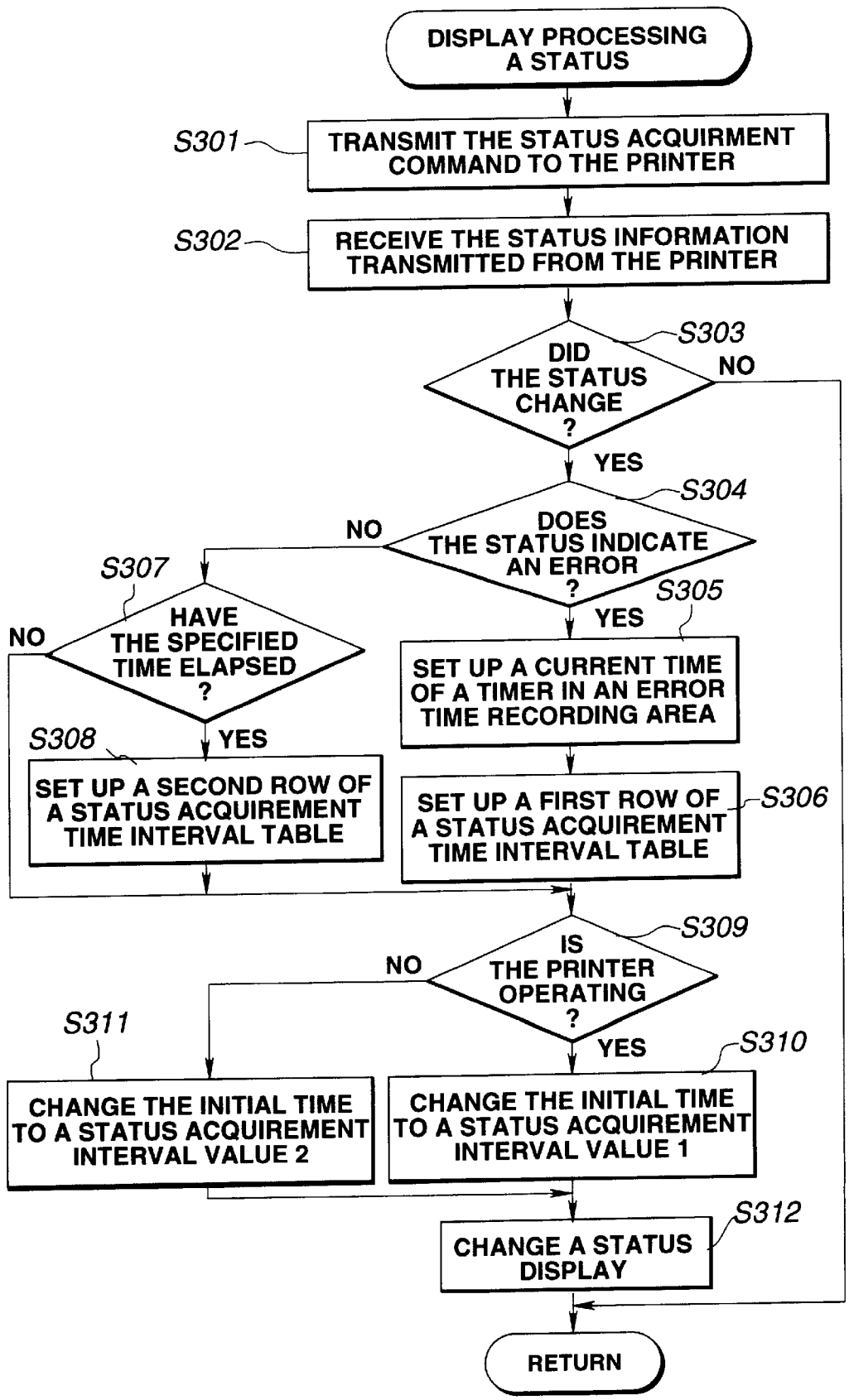
FIG. 6 is a flow chart showing the flow of status displaying processing in the host computer concerning the second embodiment.

FIG. 6 is a flow chart showing the flow of status displaying processing in the host computer. The process steps shown in FIG. 6 are stored program process steps that are stored in a computer readable memory medium, in this case in hard disk 8, as explained below in connection with FIG. 12. CPU 6 transmits a status interrogation command to printer 2 to search if printer 2 is operating or in an error state in step S301. Then, CPU 6 receives the status information transmitted from printer 2 and stores the received status information in the work memory in RAM 7 in step S302. The status information includes the operation information and error information of printer 2, shown in FIG. 4. FIG. 4 shows a data format for storing status information. The value of the information is used as described below.

After CPU 6 in host computer 1 receives the status information from printer 2 and stores the status information in the work memory in RAM 7, CPU 6 determines if the received status information changes from a status information of printer 2 which is displayed on CRT 5 of host computer 1 in step S303.

Furthermore, the status information of printer 2 which is displayed on CRT 5 is stored in the work memory in RAM 7. CPU 6 determines if the received status has changed from the stored status information by comparing the received status information with the stored status information in step S303.

When CPU 6 determines that the received status information changes from the status information which is displayed on CRT 5, CPU 6 determines if a status information in the error status field of the received status information indicates that printer 2 is in an error state or not in step S304. If it is determined in step S304 that the status information in the error status field indicates that printer 2 is in an error state, CPU 6 sets up a current time of a timer (not shown) in an error time storage area (not shown) in RAM 7 in step S305. CPU 6 then selects a first row of a status interrogation time interval table, such as the table shown in FIG. 7, sets up a first line of the first row in the field of the status interrogation time interval value 1 shown in FIG. 5, sets up a second line of the first row in the field of the status interrogation time interval value 2 in FIG. 5 in step S306, and flow advances to step S309.

On the other hand, if it is determined in step S304 that the status information in the error status field indicates that printer 2 is not in an error state, CPU 6 compares the time stored in the error time storage area in RAM 7 in step S305 with a current time of the timer and determines if a specified time (e.g. 1.0 seconds) stored in a specified time storing RAM 7 has elapsed since the time set up in the error time recording area in step S305, in step S307.

If it is determined that the specified time has already elapsed in step S307, CPU 6 selects a second row of the status interrogation time interval table, such as the table shown in FIG. 7, sets up a first line of the second row in the field of the status interrogation time interval value 1 shown in FIG. 5, sets up a second line of the second row in the field of the status interrogation time interval value 2 in FIG. 5 in step S308, and flow advances to step S309.

On the other hand, if it is determined that the specified time has not elapsed yet in step S307, flow advances to step S309 directly.

Further, when an error has not been generated, CPU 6 determines if the specified time has elapsed since CPU 6 executes the printer status display program in step S307.

The status interrogation time table shown in FIG. 7 is in RAM 7 and a memory area to store a status time interval T1 in case that printer 2 is operating and is in an error state, a status time interval T2 in case that printer 2 is not operating and is in an error state, a status time interval T3 in case that printer 2 is not in an error state and is operating, and a status time interval T4 in case that printer 2 is not in an error state and is not operating.

For example, T1 may be set to 0.5 second, T2 may be set to 1.0 second, T3 may be set to 1.0 second, and T4 may be set to 2.0 second, in advance, in order that T1 is shorter than T2, T3 is shorter than T4, T1 is shorter than T3, and T2 is shorter than T4.

FIG. 7 shows a data format of a status interrogation time interval table.

After step S306, step S307 or step S308, CPU 6 determines if printer 2 is operating, namely, loading, printing or ejecting, on the base of status information in the operation field of the status information received from printer 2.

If it is determined in step S309 that printer 2 is operating, CPU 6 changes the time stored in the status interrogation time interval storage area in RAM 7 to the time stored in the field of the status interrogation time interval value 1 in step S310, and flow advances to step S312.

On the other hand, if it is determined in step S309 that printer 2 is not operating, CPU 6 changes the time stored in the status interrogation time interval recording area in RAM 7 to the time stored in the field of the status interrogation time interval value 2 in step S311, and flow advances to step S312.

Figure 11:
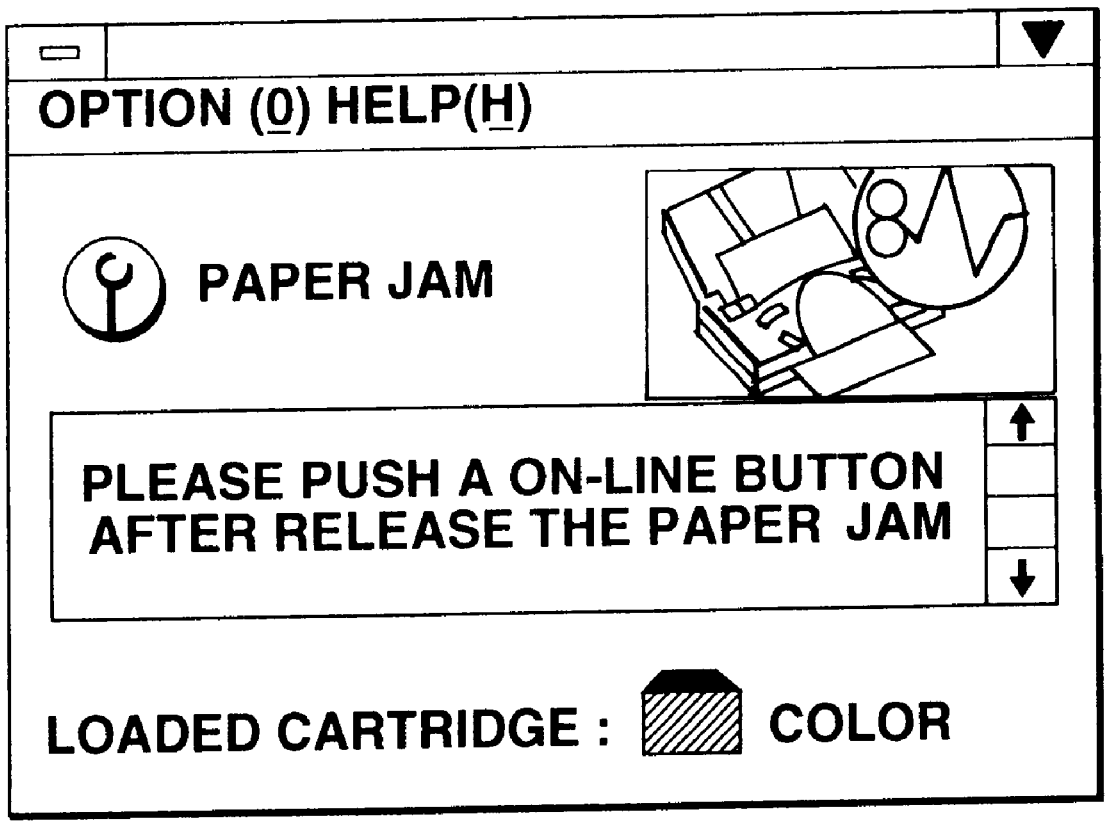
FIG. 11 is a representation view of a window display for indicating a status that the printer is in a jam error, concerning the second embodiment.

After step S310 or step S311, CPU 6 displays the status information received from printer 2 in step S302 on CRT 5 in step S312, and flow returns to step S103 shown in FIG. 2 to repeat the series of operations. For example, if it is determined that printer 2 is in a jam error state, CPU 6 displays a window display shown in FIG. 11 on CRT 5 in step S312.

Further, a time interval to update a status display in case that printer 2 is in an error state is shorter than that in case that printer 2 is not in an error state. Also, a time interval to update a status display in case that printer 2 is operating, namely, loading, printing or ejecting, is shorter than that in case that printer 2 is not operating.

As described above, when CPU 6 determines that printer 2 is in an error state, CPU 6 sets up the time interval to repeat process steps in which CPU 6 receives the status information from printer 2 after CPU 6 transmits the status interrogation command to printer 2, so that the time interval is set shorter than that in case that printer 2 is not in an error state. Further, when printer 2 is in an error state, CPU 6 can make the time interval to update a status display short and the user can deal with the error of printer 2 promptly. For example, when printer 2 is in a jam error state, the user can deal with the jam error of printer 2 promptly referring to the window display shown in FIG. 11 on CRT 5.

After the error state is released, CPU 6 keeps the time interval to acquire a status information short until the specified time (i.e. 1.0 seconds) has elapsed after the error generation.

Further, when the error generates again shortly after the error was released (i.e. within the specified time), CPU 6 can display the status display promptly and urge the user to deal with the error exactly.

The present invention can be applied to a system constituted by a plurality of devices or to an apparatus comprising a single device.

Further, the object of the present invention can also be achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Figure 12:
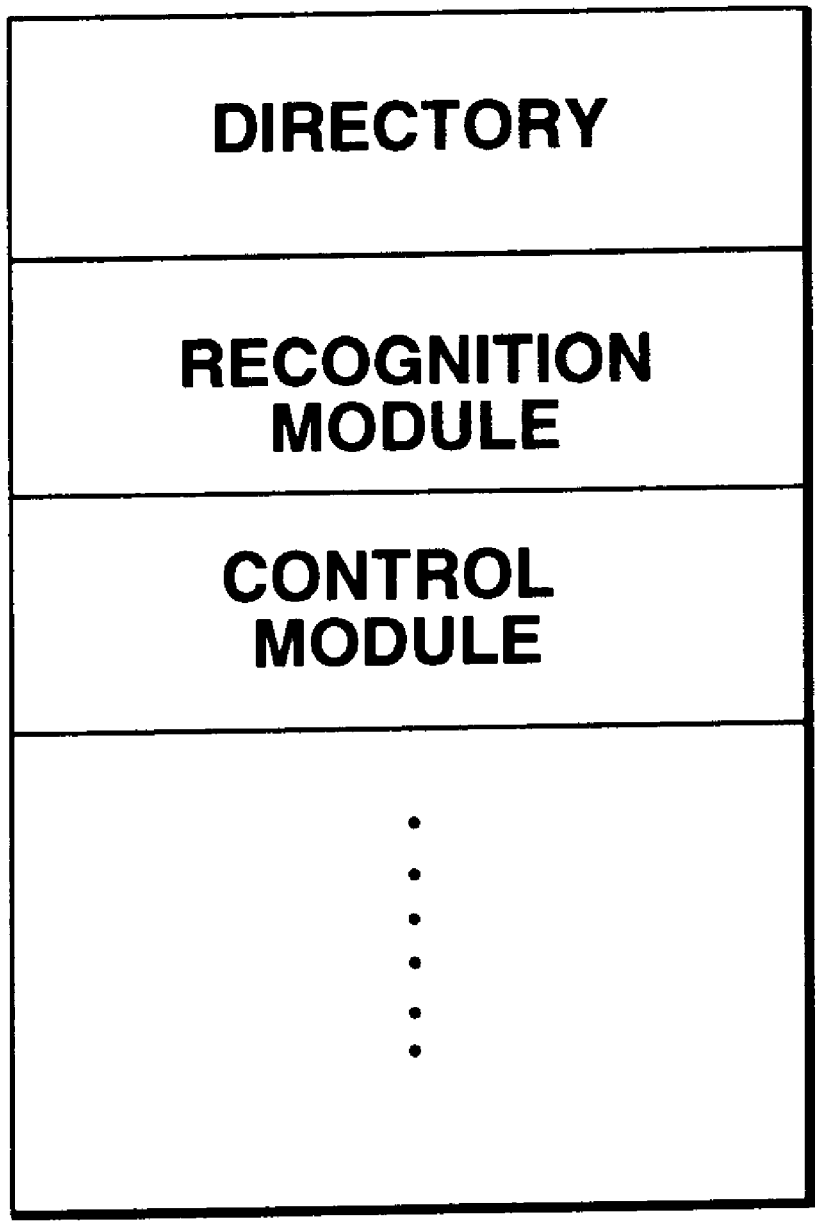
FIG. 12 is showing a memory map of a memory medium storing a printer status display program, concerning the first and second embodiments.

FIG. 12 is showing a memory map of a memory medium such as hard disc 8 storing the printer status display program concerning the above embodiments.

A memory medium storing a program to control a time interval to transmit an interrogation command which an information processing apparatus uses to demand a status of a printer to the printer corresponding to information which indicates a status of the printer is used in the information processing apparatus such as a host computer controlling the printer via a bi-directional interface. The memory medium stores program codes of a recognition module and control module at least as is shown FIG. 12.

The recognition module is program code to recognize a status of the printer based on status information which was acquired from the printer.

The control module is program code to control a time internal to transmit an interrogation command which the information processing apparatus uses to demand status of the printer to the printer corresponding to information which indicates a status of the printer.

Further, the storage medium, such as a floppy disk, an optical disk, a magneto-optical disk, CD-ROM, CD-R, a magnetic tape, a non-volatile type memory card, and ROM can be used for providing the program codes.

According to the information processing apparatus of the present invention, the information processing apparatus can recognize a status of the printer based on status information which was acquired from the printer and control a time interval to transmit a command which the information processing apparatus uses to demand a status of the printer to the printer corresponding to information which indicates a status of the printer. As a result, a time difference between a status change of the printer and a discovery of the status change of the printer which was displayed on a display of the information processing apparatus can be decreased performance reduction of the information processing apparatus such as a host computer and the printer can be avoided.

For example, when the status information indicates that the printer is operating, the time interval is set up short, namely, is decreased. As a result, the status display can be updated at the short time interval corresponding the status which changes frequently.

Also, for example, when the status information indicates that the printer is not operating, the time interval is set up long, namely, is increased. As a result, a frequency of update of a status display can be made low corresponding to the status which does not change frequently, as compared with the case that printer 2 is operating.

Also, for example, when the status information indicates that the printer is in an error state, the time interval is set up short, namely, is decreased. As a result, the status display can be updated at the short time interval corresponding the status which changes frequently and the user can deal with the error of the printer promptly.

Also, for example, when the status information indicates that the printer is in an error state and operating, the time interval is set to T1 (e.g., 0.5 second), namely, is minimized. As a result, the status display can be updated at the shortest time interval corresponding to the status which changes frequently and the user can deal with the error of the printer promptly.

Also, for example, when the status information indicates that the printer is in a normal state and is not operating, the time interval is set long, namely, is maximized. As a result, a frequency of update of a status display can be made lowest corresponding to the status which does not change frequently, as compared with the case that printer 2 is operating.

The present invention is not limited to the above embodiments and various changes and modifications can be made within the spirit and scope of the present invention. Therefore, to apprise the public of the scope of the present invention the following claims are made.

Although the present embodiment is described in reference to a printer, the present invention may also be used in conjunction with other peripheral devices such as facsimile, copy machine, scanner, printer, and so on.

What is claimed is:

1. An information processing apparatus for controlling a perpipheral device via a bi-directional interface connected to the peripherel device, comprising:

acquirement means for acquiring status information from the peripheral device over the bi-directional interface, the status information indicating status of the peripheral device; and control means for controlling a time interval to transmit a command which the information processing apparatus uses to request status of the peripheral device, corresponding to the status information acquired by said acquirement means.

2. The apparatus according to claim 1, wherein when the status information indicates that the peripheral device is operating, the control means decreases the time interval.

3. The apparatus according to claim 1, wherein when the status information indicates that the peripheral device is not operating, the control means increases the time interval.

4. The apparatus according to claim 1, wherein when the status information indicates that the peripheral device is in an error status, the control means decreases the time interval.

5. The apparatus according to claim 1, wherein when the status information indicates that the peripheral device is in an error status and is operating, the control means minimizes the time interval.

6. The apparatus according to claim 1, wherein when the status information indicates that the peripheral device is in a normal status and is not operating, the control means maximizes the time interval.

7. The apparatus according to claim 1 further comprising reception means for receiving the status information from the peripheral device.

8. The apparatus according to claim 1 further comprising transmission means for transmitting the request command to the peripheral device.

9. The apparatus according to claim 1, further comprising display means for display the status of the peripheral device.

10. A peripheral device control method for an information processing apparatus, the method for controlling a peripheral device via a bi-directional interface connected to the peripheral device, comprising:

an acquirement step to acquire status information from the peripheral device over the bi-directional interface, the status information indicating status of the peripheral device; and a control step to control a time interval to transmit a command to the peripheral device which the information processing apparatus uses to request status of the peripheral device, corresponding to the status information acquired by said acquirement step.

11. The method according to claim 10, wherein when the status information indicates that the peripheral device is operating, the control step increases the time interval.

12. The method according to claim 10, wherein when the status information indicates that the peripheral device is not operating, the control step increases the time interval.

13. The method according to claim 10, wherein when the status information indicates that the peripheral device is in an error status, the control step decreases the time interval.

14. The method according to claim 10, wherein when the status information indicates that the peripheral device is in an error status and is operating, the control step minimizes the time interval.

15. The method according to claim 10, wherein when the status information indicates that the peripheral device is in a normal status and is not operating, the control step maximizes the time interval.

16. The method according to claim 10, further comprising a reception step of receiving the status information from the peripheral device via a receiver.

17. The method according to claim 10, further comprising a transmission step of transmitting the request command to the peripheral device via a transmitter.

18. The method according to claim 10, further comprising a display step of displaying the status of the peripheral device on display unit.

19. A memory medium storing a control program for an information processing apparatus, the control program for controlling a peripheral device via a bi-directional interface, said control program comprising:

an acquirement step to acquire status information from the peripheral device over the bi-directional interface, the status information indicating status of the peripheral device;

a control step to control a time interval to transmit a command to the peripheral device which the information processing apparatus uses to request status of the peripheral device, corresponding to the status information acquired by said acquirement step.

20. A memory medium according to claim 19, wherein when the status information indicates that the peripheral device is operating, the control step decreases the time interval.

21. A memory medium according to claim 19, wherein when the status information indicates that the peripheral device is not operating, the control step increases the time interval.

22. A memory medium according to claim 19, wherein when the status information indicates that the peripheral device is in an error status, the control step decreases the time interval.

23. A memory medium according to claim 19, wherein when the status information indicates that the peripheral device is in an error status and is operating, the control step minimizes the time interval.

24. A memory medium according to claim 19, wherein when the status information indicates that the peripheral device is in a normal status and is not operating, the control step maximizes the time interval.

25. A memory medium according to claim 19, wherein when the control program further comprises a reception step to receive the status information from the peripheral device via a receiver.

26. A memory medium according to claim 19, wherein when the control program further comprises a transmission step to transmit the request command to the peripheral device via a transmitter.

27. A memory medium according to claim 19, wherein the control program further comprises a display step to display the status of the peripheral device on a display unit.

28. A program stored in a memory medium in an information processing apparatus for controlling a peripheral device via a bi-directional interface, comprising:

an acquirement step to acquire status information from the peripheral device over the bi-directional interface, the status information indicating status of the peripheral device; and a control step to control a time interval to transmit a command to the peripheral device which the information processing apparatus uses to request status of the peripheral device, corresponding to the status information acquired by said acquirement step.

29. A program according to claim 28, wherein when the status information indicates that the peripheral device is operating, the control step decreases the time interval.

30. A program according to claim 28, wherein when the status information indicates that the peripheral device is not operating, the control step increases the time interval.

31. A program according to claim 28, wherein when the status information indicates that the peripheral device is in an error status, the control step decreases the time interval.

32. A program according to claim 28, wherein when the status information indicates that the peripheral device is in an error status and is operating, the control step minimizes the time interval.

33. A program according to claim 28, wherein when the status information indicates that the peripheral device is in a normal status and is not operating, the control step maximizes the time interval.

34. A program according to claim 28, further comprising a reception step to receive the status information from the peripheral device via a receiver.

35. A program according to claim 28, further comprising a transmission step to transmit the request command to the peripheral device via a transmitter.

36. A program according to claim 28, further comprising a display step to display the status of the peripheral device on a display unit.

37. An information processing apparatus for controlling a peripheral device via a bi-directional interface connected to the peripheral device, comprising:

a processor for acquiring status information from the peripheral device over the bi-directional interface, the status information indicating status of the peripheral device and for controlling a time interval to transmit a command to the peripheral device which the information processing apparatus uses to request status of the peripheral device, corresponding to the acquired information.

38. The apparatus according to claim 37, wherein when the status information indicates that the peripheral device is operating, the processor decreases the time interval.

39. The apparatus according to claim 37, wherein when the status information indicates that the peripheral device is not operating, the processor increases the time interval.

40. The apparatus according to claim 37, wherein when the status information indicates that the peripheral device is in an error status, the processor decreases the time interval.

41. The apparatus according to claim 37, wherein when the status information indicates that the peripheral device is in an error status and is operating, the processor minimizes the time interval.

42. The apparatus according to claim 37, wherein when the status information indicates that the peripheral device is in a normal status and is not operating, the processor maximizes the time interval.

43. The apparatus according to claim 37, further comprising a receiver for receiving the status information from the peripheral device.

44. The apparatus according to claim 37, further comprising a transmitter for transmitting the request command to the peripheral device.

45. The apparatus according to claim 37, further comprising a display for displaying the status of the peripheral device.

46. A system comprising a peripheral device and an information processing apparatus for controlling the peripheral device via a bi-directional interface connected to the peripheral device, comprising wherein said peripheral device includes an output unit for output of output data, and wherein said information processing apparatus includes a processor for sending a request over the bi-directional interface to the peripheral device, the request being a request for output of status information of the peripheral device by the output unit, said processor further for acquiring the status information of the peripheral device from the peripheral device over the bi-directional interface and for controlling a time interval to transmit the request to the peripheral device, corresponding to the acquired information.

47. The system according to claim 46, wherein when the status information indicates that the peripheral device is operating, the processor decreases the time interval.

48. The system according to claim 46, wherein when the status information indicates that the peripheral device is not operating, the processor increases the time interval.

49. The system according to claim 46, wherein when the status information indicates that the peripheral device is in an error status, the processor decreases the time interval.

50. The system according to claim 46, wherein when the status information indicates that the peripheral device is in an error status and is operating, the processor minimizes the time interval.

51. The system according to claim 46, wherein when the status information indicates that the peripheral device is in a normal status and is not operating, the processor maximizes the time interval.

52. The system according to claim 46, further comprising a receiver for receiving the status information from the peripheral device.

53. The system according to claim 47, further comprising a transmitter for transmitting the request command to the peripheral device.

54. The system according to claim 47, further comprising a display for displaying the status information from the peripheral device.

* * * * *

UNITED STATES PATENT AND TRADEMARK OFFICE
CERTIFICATE OF CORRECTION

PATENT NO. : 5,943,503

DATED : August 24, 1999

INVENTOR(S) : HIROSHI KAI

It is certified that error appears in the above-identified patent and that said Letters Patent is hereby corrected as shown below:

SHEET 2

Fig. 2, "INTERNAL" should read --INTERVAL--.

COLUMN 2

Line 4, "a" should read --an--.
    Line 45, "a" (first occurrence) should read --an--.

COLUMN 3

Line 3, "embodiment." should read --embodiments.--.
    Line 6, "embodiment." should read --embodiments.--
    Line 22, "a" (first occurrence) should read --an--.

COLUMN 4

Line 4, "dada" should read --data--.
    Line 46, "connected" should read --connected to--.

UNITED STATES PATENT AND TRADEMARK OFFICE
CERTIFICATE OF CORRECTION

PATENT NO. : 5,943,503

DATED : August 24, 1999

INVENTOR(S) : HIROSHI KAI

It is certified that error appears in the above-identified patent and that said Letters Patent is hereby corrected as shown below:

COLUMN 5

Line 15, "first" should read --the first--.
    Line 37, "CRT5" should read --CRT 5--.
    Line 43, "step 103" should read --step S103--.
    Line 46, "103" should read --S103--.
    Line 51, "step 104" should read --step S104--.

COLUMN 6

Line 62, "2.0 second)" should read --2.0 seconds)--.

COLUMN 8

Line 51, "1.0 seconds)" should read --10 seconds)--.

UNITED STATES PATENT AND TRADEMARK OFFICE
CERTIFICATE OF CORRECTION

PATENT NO. : 5,943,503

DATED : August 24, 1999

INVENTOR(S) : HIROSHI KAI

It is certified that error appears in the above-identified patent and that said Letters Patent is hereby corrected as shown below:

COLUMN 9

Line 57, "1.0 seconds)" should read --10 seconds)--.

COLUMN 10

Line 23, "internal" should read --interval--.
   Line 41, "decreased" should read --decreased and--.

COLUMN 11

Line 53, "for display" should read --for displaying--.

COLUMN 12

Line 25, "display" should read --a display--.
   Line 51, "when" should be deleted.

UNITED STATES PATENT AND TRADEMARK OFFICE
CERTIFICATE OF CORRECTION

PATENT NO. : 5,943,503

DATED : August 24, 1999

INVENTOR(S) : HIROSHI KAI

It is certified that error appears in the above-identified patent and that said Letters Patent is hereby corrected as shown below:

COLUMN 14

Line 21, "comprising" should be deleted.

Signed and Sealed this

Ninth Day of May, 2000

Attest:

Q. TODD DICKINSON

*Attesting Officer*          *Director of Patents and Trademarks*